United States Patent
Knoedl et al.

(10) Patent No.: US 11,930,893 B2
(45) Date of Patent: Mar. 19, 2024

(54) TONGUE FOR A SEAT BELT

(71) Applicant: ZF AUTOMOTIVE GERMANY GMBH, Alfdorf (DE)

(72) Inventors: Ralf Knoedl, Alfdorf (DE); Dominik Seitzer, Waldstetten (DE); Hans-Peter Betz, Böbingen (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 164 days.

(21) Appl. No.: 17/601,938

(22) PCT Filed: Apr. 9, 2020

(86) PCT No.: PCT/EP2020/060160
§ 371 (c)(1),
(2) Date: Oct. 7, 2021

(87) PCT Pub. No.: WO2020/208142
PCT Pub. Date: Oct. 15, 2020

(65) Prior Publication Data
US 2022/0132998 A1 May 5, 2022

(30) Foreign Application Priority Data
Apr. 12, 2019 (DE) .................. 10 2019 109 697.9

(51) Int. Cl.
*B60R 22/185* (2006.01)
*A44B 11/25* (2006.01)
*B60R 22/18* (2006.01)

(52) U.S. Cl.
CPC ........ *A44B 11/2561* (2013.01); *B60R 22/185* (2013.01); *B60R 2022/1812* (2013.01)

(58) Field of Classification Search
CPC .................... B60R 22/185; B60R 2022/1812
See application file for complete search history.

(56) References Cited

U.S. PATENT DOCUMENTS 4,101,171 A * 7/1978 Sasaki ................ A44B 11/2561
297/483
4,848,794 A * 7/1989 Mader ................ A44B 11/2557
297/483

(Continued)

FOREIGN PATENT DOCUMENTS

| CN | 210970974 U | * 7/2020 |
| DE | 1233188 B | 1/1967 |

(Continued)

OTHER PUBLICATIONS

PCT Search Report for corresponding Application Serial No. PCT/EP2020/060160, dated Jun. 22, 2020, pp. 1-5.

*Primary Examiner* — Barry Gooden, Jr.
(74) *Attorney, Agent, or Firm* — TAROLLI, SUNDHEIM, COVELL & TUMMINO L.L.P.

(57) ABSTRACT

A plug-in tongue for a seatbelt includes a plug-in tongue component (10) and a clamping member (12) mounted thereto, wherein a belt guide passage (30) is delimited between the plug-in tongue component (10) and the clamping member (12), and the clamping member (12) comprises a center part (18) and two lateral parts (20) extending from the two ends of the center part (18) transversely to the latter. The plug-in tongue is characterized in that the center part (18) includes a central guide surface (32) located between the two lateral parts (20), and the two lateral parts (20) include lateral guide surfaces (34) facing each other, the guide surfaces (32, 34) constituting limitations of the belt guide passage (30).

10 Claims, 4 Drawing Sheets

(56) References Cited

U.S. PATENT DOCUMENTS

| | | | | |
|---|---|---|---|---|
| 4,876,770 | A * | 10/1989 | Bougher | B60R 22/30 24/196 |
| 4,878,272 | A * | 11/1989 | Kotikovsky | A44B 11/2561 297/468 |
| 4,962,572 | A * | 10/1990 | Prentkowski | A44B 11/2557 24/196 |
| 5,058,244 | A * | 10/1991 | Fernandez | A44B 11/2557 297/483 |
| 5,806,148 | A * | 9/1998 | McFalls | A44B 11/2561 24/171 |
| 5,870,816 | A * | 2/1999 | McFalls | B60R 22/30 29/434 |
| 7,010,836 | B2 * | 3/2006 | Acton | A44B 11/2557 24/265 BC |
| 7,325,280 | B2 * | 2/2008 | Ichida | B60R 22/185 24/265 BC |
| 8,079,616 | B2 * | 12/2011 | Higuchi | B60R 22/4604 280/808 |
| 8,793,844 | B2 * | 8/2014 | McFalls | A44B 11/2553 24/182 |
| 9,409,537 | B2 * | 8/2016 | Zhang | B60R 22/28 |
| 10,442,394 | B2 * | 10/2019 | Hermann | B60R 22/1855 |
| 10,518,740 | B2 * | 12/2019 | Ruthinowski | A44B 11/2561 |
| 10,525,929 | B2 * | 1/2020 | Ruthinowski | A44B 11/2561 |
| 10,843,657 | B2 * | 11/2020 | Krambeck | B60R 22/1855 |
| 11,311,431 | B2 * | 4/2022 | Scheenstra | A44B 11/2557 |
| 2006/0138852 | A1 * | 6/2006 | Ichida | A44B 11/2557 297/483 |
| 2006/0226694 | A1 * | 10/2006 | Higuchi | B60R 22/4604 297/483 |
| 2012/0068520 | A1 * | 3/2012 | McFalls | A44B 11/2561 24/593.1 |
| 2017/0297528 | A1 | 10/2017 | Hermann et al. | |
| 2019/0135224 | A1 * | 5/2019 | Krambeck | B60R 22/1855 |
| 2019/0263348 | A1 * | 8/2019 | Ruthinowski | B60R 22/19 |
| 2019/0263349 | A1 * | 8/2019 | Ruthinowski | B60R 22/1855 |
| 2019/0263350 | A1 * | 8/2019 | Ruthinowski | A44B 11/2557 |
| 2019/0263351 | A1 * | 8/2019 | Ruthinowski | A44B 11/2557 |
| 2020/0238947 | A1 * | 7/2020 | Hermann | A44B 11/006 |
| 2021/0345734 | A1 * | 11/2021 | Hermann | B60R 22/18 |
| 2021/0378366 | A1 * | 12/2021 | Ziv | A44B 11/2561 |
| 2023/0202424 | A1 * | 6/2023 | Penfold | B60R 22/18 24/579.11 |

FOREIGN PATENT DOCUMENTS

| | | | |
|---|---|---|---|
| DE | 19705386 A1 | 8/1998 | |
| DE | 102014106097 A1 * | 11/2015 | B60R 22/18 |
| DE | 112014003834 T5 | 4/2016 | |
| DE | 102017121613 A1 | 3/2019 | |
| WO | 2012/042394 A2 | 4/2012 | |
| WO | 2013/071927 A1 | 5/2013 | |
| WO | 2013/125442 A1 | 8/2013 | |
| WO | 2015/140341 A1 | 9/2015 | |

* cited by examiner

TONGUE FOR A SEAT BELT

RELATED APPLICATIONS

This application is a U.S. National Stage Application filed under 35 USC 371, claiming priority to Serial No. PCT/EP2020/060160, filed on 9 Apr. 2020; which claims priority from German Patent Application DE 10 2019 109 697.9, filed 12 Apr. 2019, the entireties of which are hereby incorporated herein by reference.

TECHNICAL FIELD

The invention relates to a plug-in tongue for a seatbelt comprising a plug-in tongue component and a clamping member attached thereto, wherein a belt guide passage is delimited between the plug-in tongue component and the clamping member, the clamping member comprising a center part and two lateral parts extending from the two ends of the center part transversely to the latter.

BACKGROUND

Generic plug-in tongues, as they are known, e.g., from DE 197 05 386 A1, serve for connecting a seatbelt to a belt buckle and thereby securing a vehicle occupant in a vehicle seat of a motor vehicle. In this way, the vehicle occupant is involved in the deceleration of the vehicle in the case of emergency braking or crash.

During a buckling operation, the plug-in tongue is guided along the seatbelt to adjust an appropriate length of the seatbelt.

The clamping member serves for clamping the seatbelt at higher loads in the plug-in tongue. During normal use, the clamping member is in a position where it does not clamp the seatbelt and, thus, the plug-in tongue can be guided along the seatbelt or the seatbelt can be guided through the plug-in tongue.

In a generic plug-in tongue, the seatbelt is strongly deflected about a center part of a clamping member of the plug-in tongue, however, resulting in higher loads on the seatbelt in this portion, which makes it difficult to guide the plug-in tongue along the seatbelt during buckling and unbuckling.

SUMMARY

It is the object of the invention to provide a compact, easy-to-handle and safe plug-in tongue for a seatbelt.

According to the invention, for a plug-in tongue of the above-mentioned type the object is achieved in that the center part includes a central guide surface located between the two lateral parts and the two lateral parts include lateral guide surfaces facing each other, the guide surfaces constituting limitations of the belt guide passage. Along with a base area of the plug-in tongue component, the guide surfaces form an enclosing limitation of the belt guide passage. Primarily due to the guide surfaces of the clamping member, during normal use the seatbelt can be guided more easily through the belt guide passage, or the plug-in tongue can be guided more easily along the seatbelt, for example during buckling and unbuckling or during normal movement of a buckled vehicle occupant.

One aspect provides that the lateral parts are designed to be at least partially wedge-shaped and/or rounded. The ergonomic wedge shape of the lateral parts improves the guiding characteristics of the seatbelt through the belt guide passage of the plug-in tongue. In addition, the rounded lateral parts prevent the seatbelt from being damaged in the case of high loads.

According to another aspect, the central guide surface comprises a clamping surface, the clamping surface being interposed especially centrally between the two lateral parts. In the case of high loads acting on the seatbelt, the clamping member is pressed against the seatbelt while clamping the seatbelt between the clamping surface and the base area of the plug-in tongue component. During normal use, the clamping surface is spaced apart from the base area so that the seatbelt can be guided smoothly through the belt guide passage of the plug-in tongue.

Of preference, the clamping surface has a roughened surface structure, in particular a grooved, corrugated or knurled surface structure. Such surface structure increases the frictional resistance between the clamping surface and the seatbelt in the case of high load and the resulting clamping of the seatbelt between the clamping surface and the base area of the plug-in tongue component.

In particular, the clamping surface includes, in the area of the lateral parts, concave recesses through which the clamping surface is separated from the lateral parts. Due to the recesses, in the case of high load, the seatbelt is not clamped at its lateral end sections but only in a section in between. The lateral end sections may be damaged more easily as compared to other sections of the seatbelt, primarily in the case of high load and the resulting clamping of the seatbelt, possibly along with an axial torsion of the seatbelt. If the seatbelt is only clamped in the section between the lateral end sections, the risk of damage can be significantly reduced.

Especially preferred, merely the clamping surface along with the lateral guide surfaces of the two lateral parts constitutes limitations of the belt guide passage. In this case, the central guide surface of the center part is the clamping surface. Along with the base area of the plug-in tongue component, the guide surfaces form an enclosing limitation of the belt guide passage.

According to one embodiment, the clamping member is movably attached to the plug-in tongue component by a safety element, especially a retaining pin. The movable mounting of the clamping member on the plug-in tongue safeguards clamping of the seatbelt in the case of high loads between the clamping surface of the clamping member and the base area of the plug-in tongue component. Accordingly, a safety mechanism comprising a retaining pin offers the advantage of simple, quick and low-cost assembly.

Another embodiment provides that each of the lateral parts has an opening that is provided for movably attaching the clamping member to the plug-in tongue component by means of a safety element, in particular by means of a retaining pin, the openings of the lateral parts facing each other on a joint axis which is in parallel to a longitudinal axis of the center part. The openings take an oval shape so that the safety element mounted therein, in particular the retaining pin mounted therein, has play. This allows the clamping member to be moved in the plug-in tongue and, thus, allows the seatbelt to be clamped, in the case of high loads, between the clamping surface of the clamping member and the base area of the plug-in tongue component.

BRIEF DESCRIPTION OF THE DRAWINGS

Further advantages and features of the invention will be evident from the following description and the drawings which are referred to, wherein.

DESCRIPTION

Figure 1:
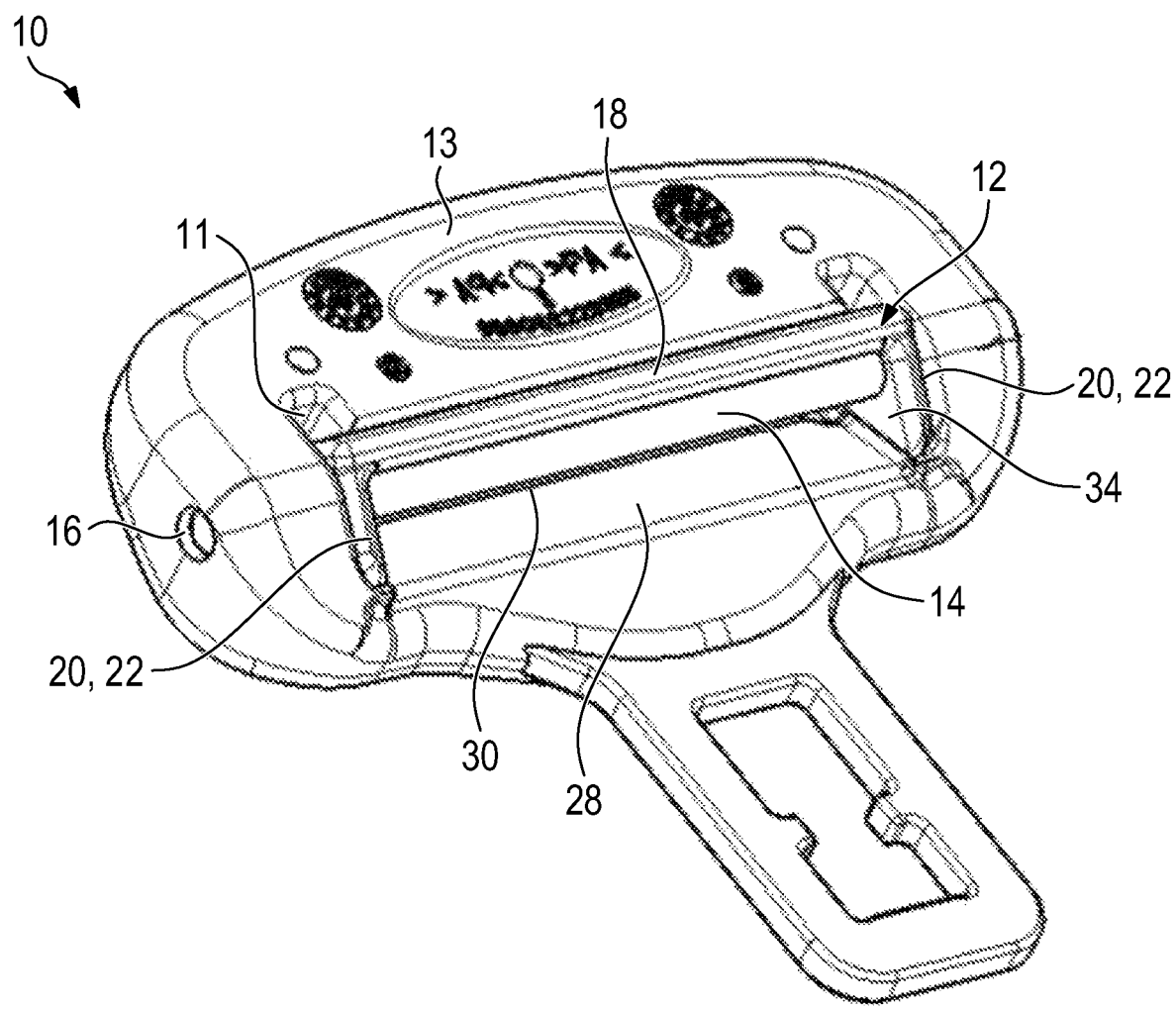
FIG. 1 shows a perspective view of a first embodiment of a plug-in tongue according to the invention, FIG. 2a) shows a perspective view of a first embodiment of a clamping member of the plug-in tongue according to the invention, FIG. 2b) shows another perspective view of the first embodiment of the clamping member of the plug-in tongue according to the invention, FIG. 3a) shows a lateral view of a second embodiment of the plug-in tongue according to the invention, FIG. 3b) shows a cross-section of the second embodiment of the plug-in tongue according to the invention, FIG. 3c) shows a longitudinal section of the second embodiment of the plug-in tongue according to the invention, FIG. 4a) shows a perspective view of a second embodiment of the clamping member of the plug-in tongue according to the invention, and FIG. 4b) shows a top view of the second embodiment of the clamping member of the plug-in tongue according to the invention.

FIG. 1 illustrates a first embodiment of a plug-in tongue 10. The plug-in tongue 10 has a clamping member 12 that is positively mounted via a safety element 14 in an indentation 11 of the plug-in tongue 10. The safety element 14 in this case is a retaining pin extending through openings 16 in a housing 13 of the plug-in tongue 10 and through openings 26 in the clamping member 12 (see FIGS. 2a and 2b).

The clamping member ends flush with the shape of the indentation 11 and comprises a center part 18 and two lateral parts 20 each projecting from one end of the center part 18 transversely to the latter.

Figure 2A:
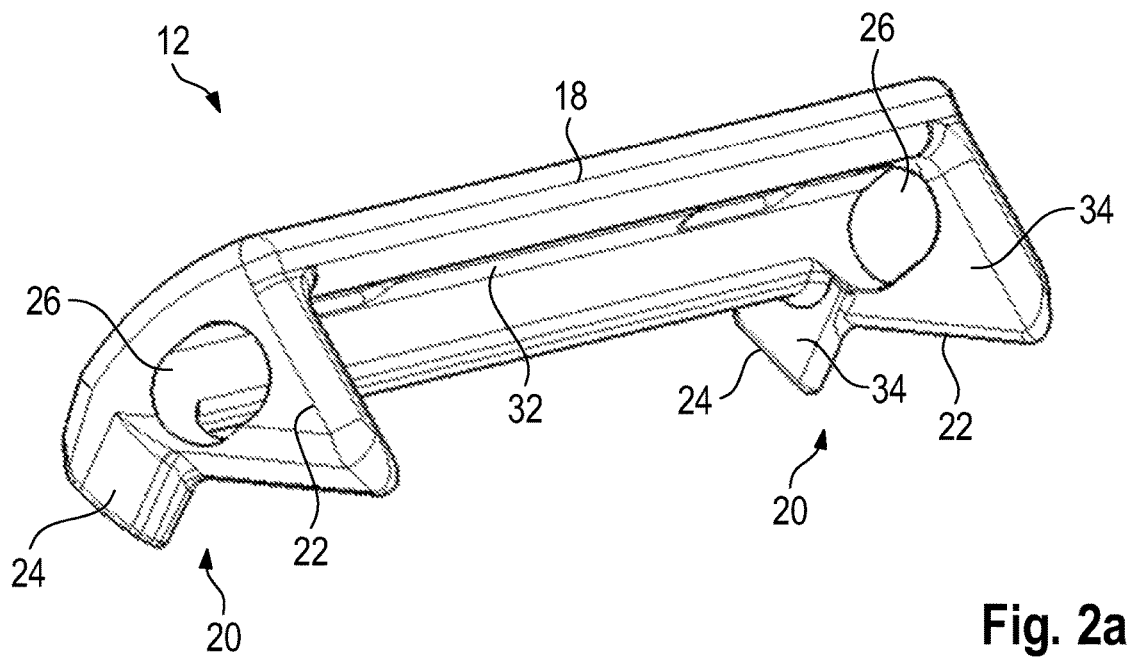

As shown in FIG. 2a, each of the lateral parts 20 has an opening 26 provided for movably attaching the clamping member 12 to the plug-in tongue 10 by means of the safety element 14. The openings 26 of the lateral parts 20 face each other on a joint axis being in parallel to a longitudinal axis of the center part 18.

Each of the two lateral parts 20 can be subdivided into a wedge-like part 22 and a cuboid-like part 24.

In a state in which the clamping member 12 is inserted in the plug-in tongue 10 (see FIG. 1), the cuboid-like parts 24 of the lateral parts 20 are provided inside the plug-in tongue 10, wherein the wedge-like parts 22 of the lateral parts 20 are disposed farther in the direction of an outer face of the plug-in tongue 10. The wedge-like part 22 of the lateral parts 20 is connected to be flush with the shape of the indentation 11 of the plug-in tongue 10 and forms, with the center part 18, a portion of an outer face of the plug-in tongue housing 13.

The surface of the center part 18 located between the lateral parts 20 and the surfaces of the lateral parts 20 facing each other constitute inner faces of the clamping member 12.

The inner faces of the clamping member 12 form, together with a base area 28 of the housing 13 of the plug-in tongue 10, an enclosing limitation of a belt guide passage 30 through which a seatbelt 38 can be guided (see FIG. 1). The inner face defined by the center part 18 thus is a central guide surface 32 and the inner faces defined by the lateral parts 20 thus are lateral guide surfaces 34.

Figure 2B:
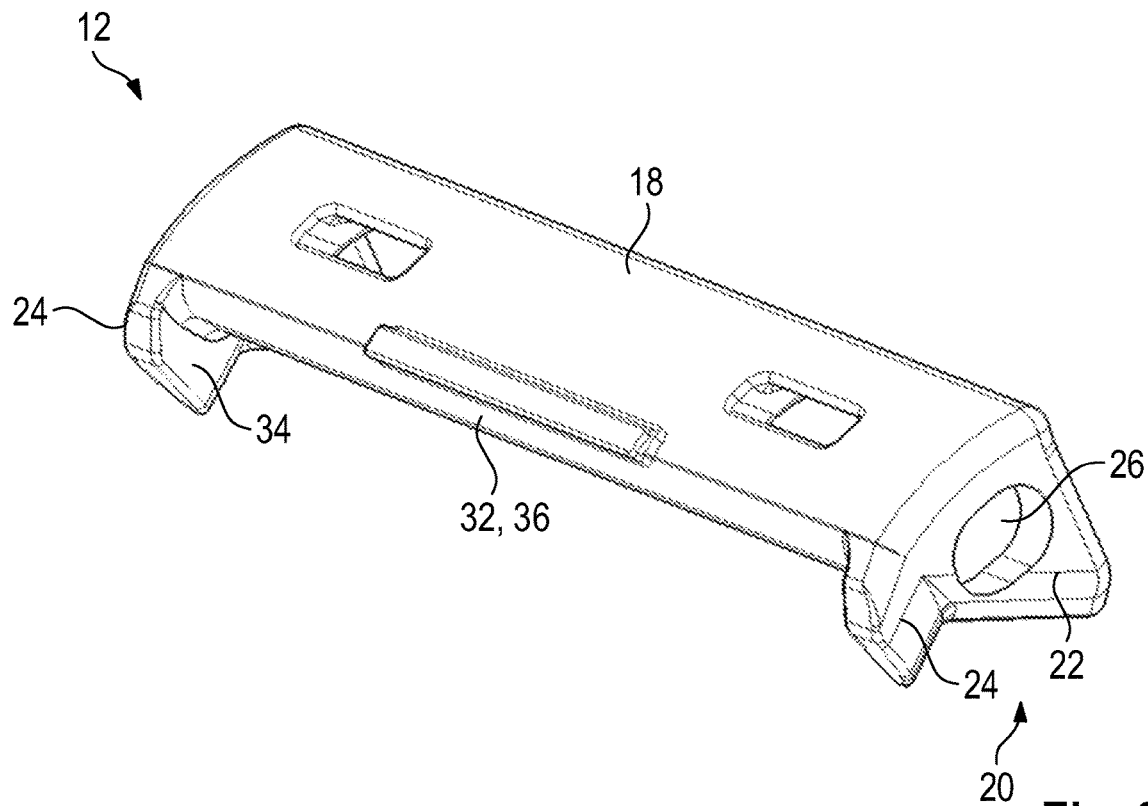

The portion of the central guide surface 32 shown in FIG. 2b and formed between the cuboid-like parts 24 of the lateral parts 20 constitutes a clamping surface 36. In the embodiment shown here, the clamping surface 36 extends between the two cuboid-like parts 24 over an entire longitudinally directed length of the center part 18.

When the seatbelt 38 is loaded (e.g., above a load threshold of 45 newtons), which may occur during crash, for example, the clamping member 12 is moved toward the seatbelt 38 while clamping the seatbelt 38 between the clamping surface 36 of the clamping member 12 and the base area 28 of the plug-in tongue housing 13.

In order to increase the frictional resistance between the seatbelt 38 and the clamping surface 36, the clamping surface 36 has a roughened surface structure. The surface structure may be grooved, corrugated, knurled or the like.

To prevent the seatbelt 36 from being damaged at high loads, primarily the edges of the center part 18 and of the lateral parts 20 which may contact the seatbelt 38 are designed to be rounded.

In FIGS. 3a, 3b, 3c and 4a, 4b, a second embodiment of the plug-in tongue 10 and the clamping member 12 is shown. For the features known from the first embodiment, like reference numerals are used and insofar the foregoing explanations shall be referred to.

The difference between the first and second embodiments of the plug-in tongue 10 consists in the fact that the plug-in tongue 10 takes a different shape and that a second embodiment of the clamping member 12 is provided which is disposed differently in the plug-in tongue 10.

The second embodiment of the clamping member 12 resembles the first embodiment.

Figure 3A:
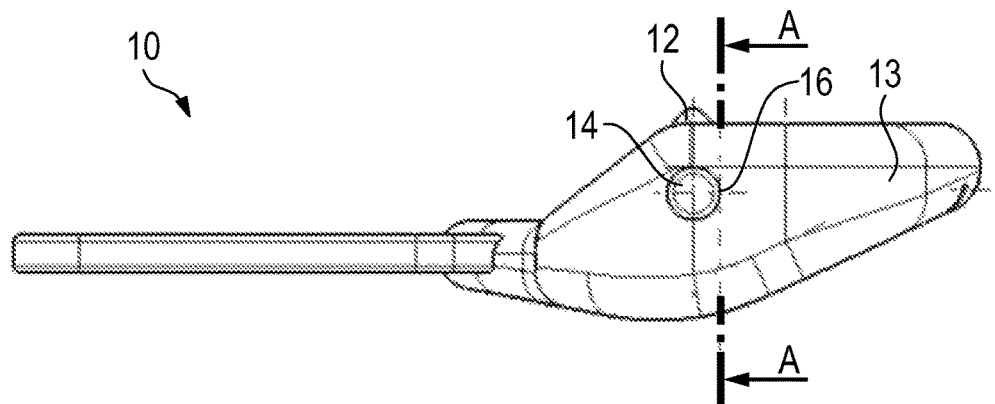
Figure 3B:
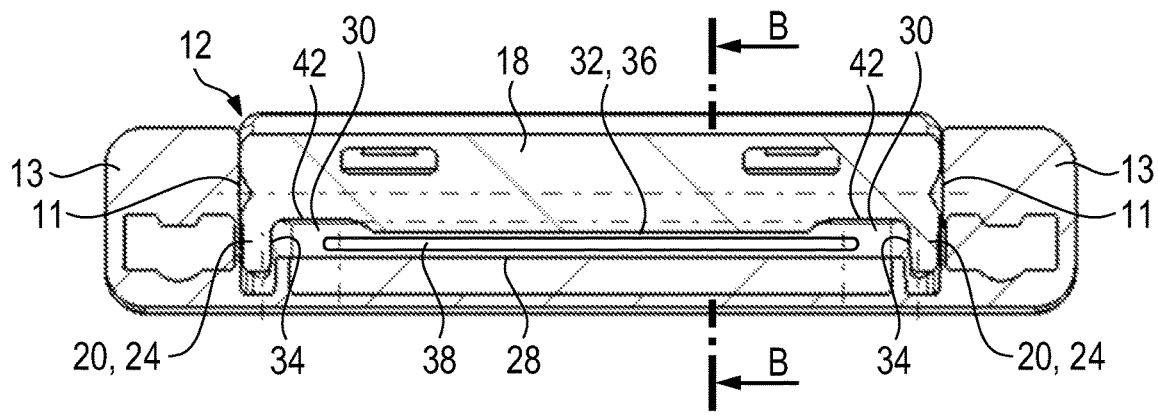
Figure 3C:
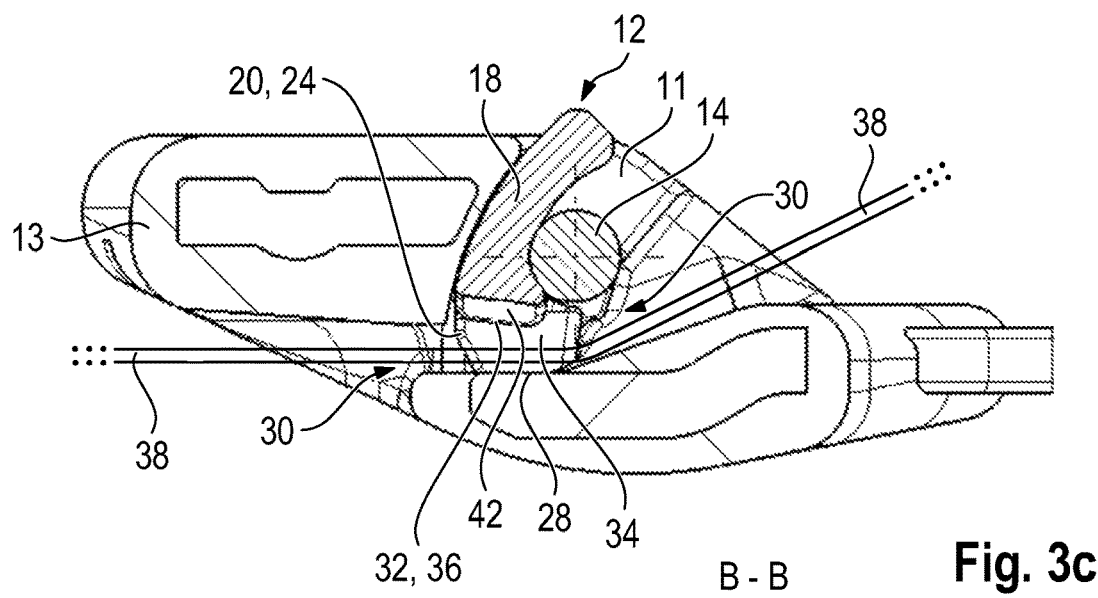

It is evident from FIGS. 3a to 3c that the clamping member 12 in the second embodiment is positively mounted in an indentation 11 of the plug-in tongue 10 via a safety element 14.

The clamping member 12 further comprises a center part 18 and two lateral parts 20 each projecting from one end of the center part 18 transversely to the latter.

Figure 4A:
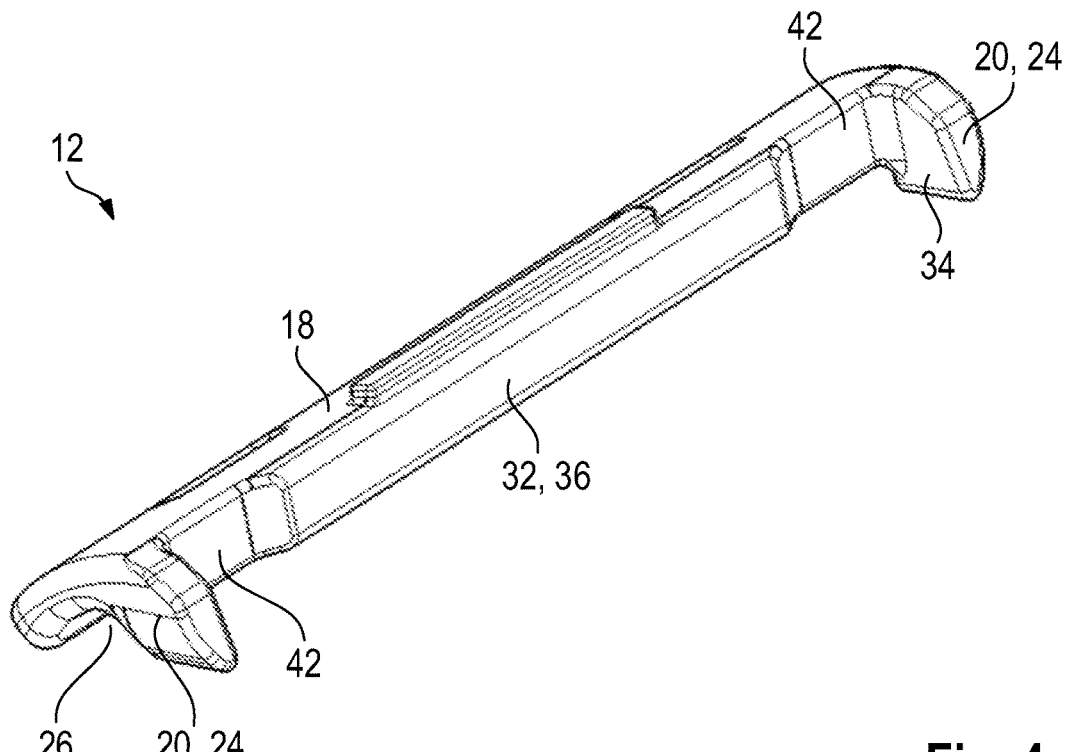

As is visible in FIG. 4a, the lateral parts 20 do not include an opening 26, but a concave curvature 26 in which the safety element 14 is adjacent (see FIG. 3c) which extends, for being fastened and for movably attaching the clamping member 12 to the plug-in tongue 10, through two openings 16 in the housing 13 of the plug-in tongue 10 in parallel to a longitudinal axis of the center part 18.

In addition, the lateral parts 20 of the second embodiment of the clamping member 12 include, in contrast to the first embodiment of the clamping member 12, only cuboid-like parts 24 rather than wedge-like parts 22. Thus, the cuboid-like parts 24 are the lateral parts 20.

In a state in which the clamping member 12 is inserted in the plug-in tongue 10 (see FIGS. 3a to 3c), the cuboid-like parts 24 are provided inside the plug-in tongue 10.

In this embodiment of the clamping member 12, the surface of the center part 18 located between the cuboid-like parts 24 and the surfaces of the cuboid-like parts 24 facing each other constitute inner faces of the clamping member 12.

FIGS. 3b and 3c reveal that the inner faces of the clamping member 12 along with a base area 28 of the housing 13 of the plug-in tongue 10 form an enclosing limitation of a belt guide passage 30 through which a seatbelt 38 may be guided. The inner face defined by the center part 18 is thus a central guide surface 32 and the inner faces defined by the cuboid-like parts 24 thus are lateral guide surfaces 34.

In the embodiment of the clamping member 12 shown here, the central guide surface 32 located exclusively between the cuboid-like parts 24 is at the same time a clamping surface 36.

Figure 4B:
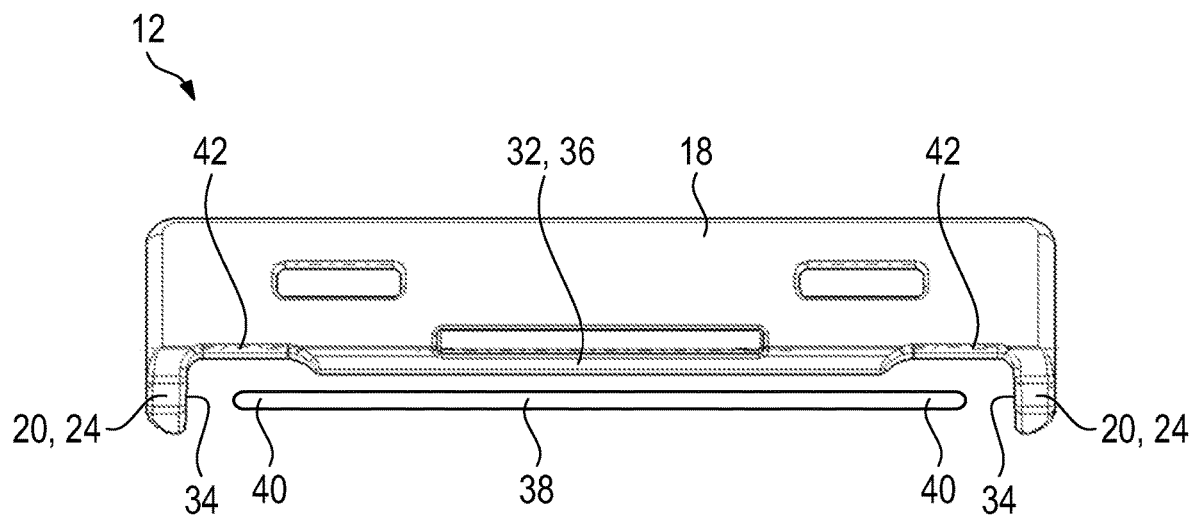

FIG. 4b reveals that, due to concave recesses 42 in the area of the cuboid-like parts 24, the central guide surface 32 or, resp., the clamping surface 32 is separated from the cuboid-like parts 24. The central guide surface 32 or, resp., the clamping surface 36 thus does not extend beyond a total longitudinally directed length of the center part 18 between the two cuboid-like parts 24 and is arranged particularly centrally between the cuboid-like parts 24.

In this embodiment of the plug-in tongue 10, too, the clamping member 12 is moved, if the seatbelt 38 is loaded (e.g., above a load threshold of 45 newtons) which may occur during crash, for example, in the direction of the seatbelt 38 while clamping the seatbelt 38 between the clamping surface 36 of the clamping member 12 and the base area 28 of the plug-in tongue housing 13.

For increasing the frictional resistance between the seatbelt 38 and the clamping surface 36, the clamping surface 36 has a roughened surface structure which may be grooved, corrugated, knurled or the like.

In order to prevent the seatbelt 38 from being damaged at high loads (e.g., above 45 newtons), primarily the edges of the center part 18 and the cuboid-like parts 24 which may contact the seatbelt 38 are designed to be rounded.

In addition, the recesses 42 which are configured not to clamp the seatbelt 38 in the area of lateral seatbelt end sections 40 are provided, for the lateral seatbelt end sections 40 constitute (during clamping) the most sensitive areas of the seatbelt 38 with respect to damage at high loads.

It is obvious to those skilled in the art to combine the advantages and features of the described embodiments and/ or to apply them to other embodiments not described here.

The invention claimed is:

1. A plug-in tongue for a seatbelt, comprising a plug-in tongue component (10) and a clamping member (12) attached thereto, wherein a belt guide passage (30) is delimited between the plug-in tongue component (10) and the clamping member (12), the clamping member (12) comprising a center part (18) and two lateral parts (20) extending from two ends of the center part (18) transversely to the center part (18), wherein the two lateral parts (20) include lateral guide surfaces (34) facing each other, the center part (18) including a clamping surface (36) that directly contacts the seatbelt (38) when a load on the seatbelt (38) is above a load threshold, the clamping surface (36) being separated from the two lateral parts (20) along a longitudinal length of the center part (18), the center part (18) and the two lateral guide surfaces (34) being limitations of the belt guide passage (30).

2. The plug-in tongue according to claim 1, wherein the two lateral parts (20) are designed to be at least partially wedge-shaped and/or rounded.

3. The plug-in tongue according to claim 1, wherein the clamping surface (36) is disposed centrally between the two lateral parts (20).

4. The plug-in tongue according to claim 3, wherein the clamping surface (36) has a roughened surface structure.

5. The plug-in tongue according to claim 3, wherein the clamping surface (36) is separated from each of the two lateral parts (20) by a concave recess (42).

6. The plug-in tongue according to claim 1, wherein the clamping member (12) is movably mounted to the plug-in tongue component (10) by a safety element (14).

7. The plug-in tongue according to claim 6, wherein the safety element (14) is a retaining pin.

8. The plug-in tongue according to claim 1, wherein each of the lateral parts (20) includes an opening (26) provided for movably mounting the clamping member (12) to the plug-in tongue component (10) by means of a safety element (14), wherein the openings (26) of the lateral parts (20) face each other on a joint axis which is in parallel to a longitudinal axis of the center part (18).

9. The plug-in tongue according to claim 8, wherein the safety element (14) is a retaining pin.

10. The plug-in tongue according to claim 1, wherein a longitudinal length of the clamping surface (36) is less than a width of the seatbelt (38).

* * * * *